(12) United States Patent
Nakajima et al.

(10) Patent No.: US 6,247,836 B1
(45) Date of Patent: Jun. 19, 2001

(54) INJECTION SCREW FOR INJECTION MOLDING A PREFORM OF A POLYESTER RESIN

(75) Inventors: Hisashi Nakajima, Nagano-ken; Hideaki Koda, Ueda, both of (JP)

(73) Assignee: A.K. Technical Laboratory, Inc. (JP)

( * ) Notice: Subject to any disclaimer, the term of this patent is extended or adjusted under 35 U.S.C. 154(b) by 0 days.

(21) Appl. No.: 09/620,749

(22) Filed: Jul. 21, 2000

Related U.S. Application Data

(62) Division of application No. 08/696,068, filed on Aug. 13, 1996, now Pat. No. 6,136,260.

(30) Foreign Application Priority Data

Aug. 14, 1995 (JP) .................................................. 7-226999

(51) Int. Cl.[7] .................................................. B29D 23/00
(52) U.S. Cl. ................... 366/88; 366/89; 425/208
(58) Field of Search .................. 425/587, 208; 366/88, 89, 90

(56) References Cited

U.S. PATENT DOCUMENTS

| | | | |
|---|---|---|---|
| 3,023,456 | * 3/1962 | Palfey .................................... | 425/208 |
| 3,263,276 | * 8/1966 | Maier .................................... | 425/587 |
| 3,762,693 | * 10/1973 | DeBoo et al. ......................... | 366/89 |
| 4,155,655 | * 5/1979 | Chiselko et al. ...................... | 366/89 |
| 4,666,649 | * 5/1987 | Takubo et al. ........................ | 425/208 |
| 5,695,710 | * 12/1997 | Chen, Sr. et al. .................... | 264/532 |

* cited by examiner

*Primary Examiner*—Robert Davis
(74) *Attorney, Agent, or Firm*—Ostrolenk, Faber, Gerb & Soffen, LLP

(57) ABSTRACT

When a desired preform is to be molded from a molding material which is a polyester resin composed of a blend of PET and PEN by compressing and melting the molding material by the rotation of a screw in a heating cylinder and injecting and filling the molten material into a mold, a plastication zone 13 for the molding material is formed between a compression zone 12 of the injection screw 2 and a metering zone 14 at an end of the screw. In the plastication zone 13, the molding material is subjected to melting, relaxation, kneading and relaxation steps in order to melt and remove an unmolten material until the molten material reaches the metering zone 14. To prevent a molded article from becoming opaque and the production of a gel-like unmolten granular material when a polyester resin composed of a blend of PET and PEN is used as a molding material.

4 Claims, 1 Drawing Sheet

INJECTION SCREW FOR INJECTION MOLDING A PREFORM OF A POLYESTER RESIN

This is a division of application Ser. No. 08/696,068, filed Aug. 13, 1996 and now U.S. Pat. No. 6,136,260.

BACKGROUND OF THE INVENTION

1. Field of the Invention

This invention relates to a process for injection molding a preform of a polyester resin, especially a blend of polyethylene terephthalate and polyethylene naphthalate as a molding material, to an injection screw therefor, and to a process for stretch blow molding a hollow molded article such as a thin-wall vessel from the preform.

2. Background Art

Since a stretch blow molded article of polyethylene terephthalate (to be abbreviated as "PET" hereinafter) has good transparency, good impact resistance and relatively good gas barrier property, it is widely used in drink bottles. As for heat resistance, it has a thermal deformation temperature (glass transition temperature) of about 75° C. and hence is subjected to a heat treatment such as heat setting to improve its heat resistance when it is used in drink bottles for juice and natural water that must be filled at high temperatures (around 80° C.). For this reason, a PET bottle called "heat resistant bottle" is more expensive than an ordinary PET bottle which is commonly used.

Polyethylene naphthalate (to be abbreviated as "PEN" hereinafter) which is a polyester resin like PET has a melting point of around 270° C. and a glass transition temperature of around 124° C., which are higher than the melting point and glass transition temperature of PET in spite that they are both a polyester resin. Moreover, PEN has satisfactory heat resistance when used as a thin-wall vessel and excellent gas barrier property and transparency when it is stretched as well as strength.

In this way, PEN is more suitable than PET for use in a drink bottle or a wide-mouthed vessel that requires high-temperature filling and gas barrier property although they are both a polyester resin. However, the material costs of PEN are higher than those of PET and a PEN bottle is much more expensive that a heat set PET bottle, thereby making it difficult to use PEN at the moment.

To solve the above problem, attempts have been made to develop a thin-wall polyester bottle having excellent heat resistance and gas barrier property which is formed from a blend of PET and PEN as a molding material. According to existing materials on heat resistance, a stretch blow molded bottle formed from PET as a substrate can withstand a temperature of 83° C. when it is blended with 10% of PEN and its heat resistance can be further improved by increasing the amount of PEN blended.

However, PET and PEN have weakness in compatibility. When they are molten and mixed together, the resulting mixture becomes semi-opaque and turbid. It is considered that this turbidity is caused by the formation of two phases by PET and PEN in a molten state and is distinguished from a whitening phenomenon caused by crystallization. However, this opacifying phenomenon can be eliminated when an ester exchange reaction is promoted during the plastication of a molding material to change the material into a copolymer at the time of injection molding. Thereby, a transparent molded article, i.e., a preform can be molded.

For the purpose of promoting and controlling an ester exchange reaction in this molten state, Amoco chemical Co. of USA provides a PEN material which is a copolymer composition containing 8.0 mol % of terephthalate and 92 mol % of 2,6-naphthalene dicarboxylate (called as "NDC"). It is said that use of this copolymer composition can reduce the crystal melting temperature (267° C.) of PEN to the same temperature as the crystal melting temperature (250° C.) of PET with the result of an increase in the contact time between PET and PEN contained in the blend in a molten state, thereby making it possible to obtain a preform in which an ester exchange reaction is promoted. However with regular injection molding which has been employed so far, it has been difficult to mold a transparent preform.

To promote an ester exchange reaction in a heating cylinder in order to mold a transparent preform, an attempt is being made to carry out plastication by setting the temperature of the heating cylinder to 310° C. or more and back pressure to a high level. It is assumed that, since melting and kneading are promoted at such a high temperature and a high back pressure and residence time is prolonged, phase separation is eliminated, and the molten material is injected in the state of a copolymer due to the promotion of an ester exchange reaction, thereby making it possible to obtain a transparent preform.

However, since the residence time of the molten material in the heating cylinder is inevitably long and the material stays in the heating cylinder at a high temperature and at a high pressure, the molten material is excessively heated and easily decomposed, and even partly gasified. This excess heat has a bad influence upon the physical properties of the polyester resin, causing discoloration, burning, deterioration and the like disadvantageously. In addition, metering time is also prolonged and accordingly, the molding cycle is naturally prolonged. Especially, in a blend of PET and PEN, PET is affected by excess heat and decomposed because the melting point of PET is lower than that of PEN, thereby increasing the amount of acetaldehyde produced.

A blend of PET and PEN has another problem to be solved in addition to its opacity. This problem is that a small gel-like granular material called "fish eye" is produced. Although this granular material does not have a great influence upon the shape of a preform, it remains on the thin-wall body of a final bottle product as a flaw, causing a defective product.

Therefore, to obtain a thin-wall bottle from a molding material which is a blend of PET and PEN and has improved heat resistance by stretch blow molding, it is necessary to prevent a preform from becoming opaque at the time of injection molding and the occurrence of a fish eye. Otherwise, it is impossible to obtain a hollow molded article of a polyester resin such as a thin-wall bottle or a wide-mouthed vessel which makes use of the physical properties of PET and PEN.

SUMMARY OF THE INVENTION

An object of the present invention is to provide a process for injection molding a preform, which can prevent opacifying caused by opaque white turbidity and the occurrence of a fish eye without adopting a high temperature and a high back pressure as in the prior art process and an injection screw therefor as well as a process for stretch blow molding a thin-wall, wide-mouthed vessel and a narrow-mouthed vessel such as a bottle from the preform.

The process for injection molding a preform of a polyester resin according to the present invention which attains the above object which comprises the steps of compressing and melting a molding material which is a polyester resin composed of a blend of PET and PEN by the rotation of a screw in a heating cylinder, and injecting and filling the molding material into a mold to mold a desired preform is characterized in that a zone for plasticating the molding material is formed between a compression zone of the screw and a metering zone at an end of the screw, and the melting, relaxation, kneading and relaxation of the molding material are performed in the plastication zone to promote the melting of an unmolten material remaining in the molten material and uniformly knead the molten material so that the unmolten material is melted and kneaded before the molten material reaches the metering zone.

The above relaxation is performed by expanding the gap between the heating cylinder of the plastication zone and a screw shaft portion with the partially reduced diameter of the screw shaft portion. In addition to this relaxation portion which receives the molten material from the compression zone has a flight-free portion.

The above blend of PET and PEN comprises 90 to 10% by weight of PET and 10 to 90% by weight of PEN. The polyethylene naphthalate is not limited to a homopolymer and may be a NDC 92 mol % copolymer composition which contains 8.0 mol % of terephthalate.

The above screw can be used as an injection screw of an in-line screw type injection unit or a plastication screw of a screw preplasticator type injection unit. In the in-line screw type injection unit, the plastication and injection of a polyester resin composition are performed by a screw whereas, in the screw preplasticator type injection. unit, only plastication is performed by a screw. The plasticated polyester resin is metered by an injection cylinder and injected by a plunger.

The process for stretch blow molding a polyester resin which is the characteristic feature of the present invention comprises the steps of releasing a preform molded by any one of the above injection molding processes from a cavity mold and a core mold of an injection mold with a mouth portion of the preform held by a lip mold in an early stage in which the inside of the preform is not completely cooled and still at a high temperature and the shape of the preform is kept by a skin layer formed on the surface by cooling, transferring the preform to a blow mold, stretching and blow-molding the preform to mold a hollow molded article such as a thin-wall vessel in the blow mold before the surface temperature of the preform is elevated by internal heat and reaches its peak temperature.

Alternatively, the preform is cooled until its shape is fully kept and released from the cavity mold and the core mold of the injection mold with its mouth portion held by the lip mold, transferred to a temperature conditioning unit to adjust the temperature of the preform to a molding temperature, then transferred to a blow mold to stretch blow mold a hollow molded article such a thin-wall vessel. Or the molded preform is kept in stock, heated to its thermal deformation temperature to be softened, and then stretch blow molded into a hollow molded article such as thin-wall vessel in a blow mold.

DETAILED DESCRIPTION OF THE PREFERRED EMBODIMENTS

Figure 1:
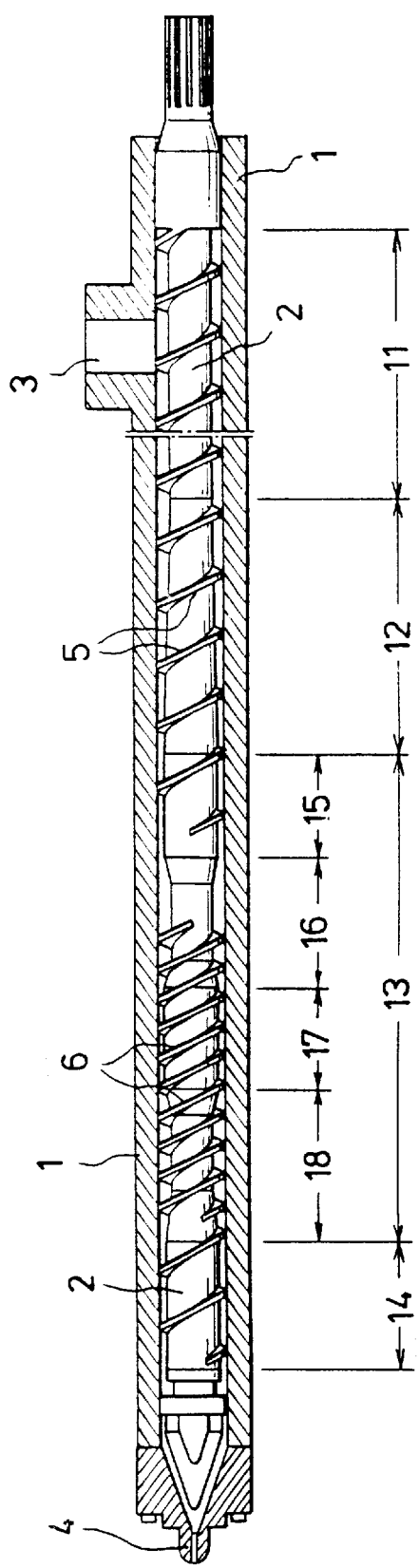
FIG. 1 is a schematic vertical sectional side view of an injection unit capable of injection molding a preform of a polyester resin according to an embodiment of the present invention.

Referring to FIG. 1, embodiment according to the present invention will be described in detail below. FIG. 1 shows an injection unit used in the process for injection molding a preform of this invention. This injection unit, as in a normal one, has an injection screw 2 inside a heating cylinder 1 equipped with a band heater (not shown) on outer periphery thereof. The injection screw 2 is rotatable and moved back and forth. The molding material from a material feed port 3 in the rear of the heating cylinder is compressed by the rotation of the injection screw 2 to be molten and kneaded (plasticated) and metered in the front of the heating cylinder 1 by the backward movement of the injection screw 2.

The injection unit has plastication and injection functions as in an ordinary injection unit that the metered molten material is injected and filled into a mold (not shown) from a nozzle 4 at the end of the heating cylinder by the forward movement of the injection screw 2 to form a preform having a bottom.

The above injection screw 2 has four step zones: a material feed zone 11, compression zone 12, plastication zone 13, and metering zone 14. The plastication zone 13 has the following operation sections between the compression zone 12 and the metering zone 14: a melting section 15, a melting relaxation section 16, a kneading section 17 and a kneading relaxation section 18.

The above relaxation sections 16 and 18 are formed by expanding the gap between the heating cylinder of the plastication zone 13 and a shaft portion of the injection screw 2 with the partially reduced diameter of the screw shaft portion (70 to 80% of the diameter of the axis of the melting section, for example). The expansion is carried out by tapering both end portions to prevent the drastic expansion of the molten material caused by a sudden change in the gap or stagnation caused by the angle of repose.

The screw flights of the screw 2 are provided around the shaft portion and consist of rear screw flights 5 for feeding and compressing the molding material and front screw flights 6 for plastication which knead the molten material, with the melting relaxation section 16 as a boundary between them. The rear screw flights 5 are provided at a fixed screw pitch from the end of the shaft portion of the material feed zone 11 to the top of the shaft portion of the melting section 15 of the plastication zone 13. The front screw flights 6 are arranged from a front half portion of the melting relaxation section 16 to the top end of the shaft portion of the metering zone 14 at a narrower pitch than that of the rear screw flights 5 due to double flights. Thereby, the rear half portion of the melting relaxation section 16 on the side of the compression zone is devoid of flights, which promotes the melting of a small unmolten material contained in the molten material without being affected by the front and rear screw flights 5 and 6.

Among the above zones of the above injection screw 2, the material feed zone 11 is made the longest, the metering zone 14 is made the shortest, and the plastication zone 13 is made longer than the compression zone 12. In the plastication zone 13, the kneading section on the side of the metering zone is made longer than the melting section. Although the L/D of the screw is longer than that of an ordinary injection screw due to the provision of the plastication zone 13, it can be limited to a range that enables the injection screw to fulfil its function. The lay-out of each zone and the length of each section are not fixed and can be changed arbitrarily according to injection capacity.

When an injection molding machine having a large injection capacity is required for the large-quantity production of preforms and the demand is satisfied by a screw-plunger preplasticator type injection unit, the injection screw 2 can be used as a plastication screw. In this case, the injection screw 2 is modified to meet the specifications of a plastication screw.

When an injection molding machine used is a screw-screw preplasticator type injection unit equipped with a plasticator on top of a rear portion of an injection unit, a plastication screw, or a plastication screw and an injection screw can be used by modifying their specifications. It is possible to use the plastication screw and the injection screw for injection molding a preform in an irregular manner by apportioning the above zones and set the above sections to both the plastication screw and the injection screw.

The granular molding material which is a blend of PET and PEN (to be referred to as "PET+PEN" hereinafter) is supplied into a rear portion of the heating cylinder 1 from the material feed opening 3 by the rotation of the injection screw 2 set at a rotation speed of 80 to 100 rpm while it is applied a back pressure of 2 to 10 kg/cm$^2$. Although the temperature of the band heater on the outer periphery of the heating cylinder is set to the range of 280 to 310° C., the temperature around the melting relaxation section 16 of the plastication zone 13 may preferably be set 10 to 15° C. lower than the temperatures of the other zones.

The PET+PEN in the heating cylinder is moved from the material feed zone 11 to the compression zone 12 by the rear screw flights 5. During this period, the PET+PEN is heated from the heating cylinder and becomes softened. In the compression zone 12, the PET+PEN is gradually crushed by transferring to the reduced gap between the heating cylinder 1 and the injection screw 2 by the inclination of the screw shaft portion and at the same time receives shearing force caused by the rotation of the rear screw flights 5 whereby it generates heat and becomes half molten state by external heat and heat generated by shearing force.

This half-molten material is pressurized and fed by the rear screw flights 5 to the melting section 15 of the plastication zone 13 in which the screw gap is narrowed to increase the compression ratio so that most of the PET+PEN is molten and supplied to the melting relaxation section 16. The melting relaxation section 16 has a much greater sectional area of the gap around the screw shaft portion than that of the melting section 15 as if the gap were present like a deep pool in a flow of the molten material. Therefore, the molten material which has been kept compressed expands and stretches in the melting relaxation section 16. Thereby the unmolten material (PEN) remaining in the molten material in the granular form is dispersed in the molten material and the flow of the molten material is slowed down.

Since a front half portion of the melting relaxation section 16 on the side of the melting section is devoid of screw and the molten material is a viscoelastic fluid, the molten material given rotational force by the injection screw 2 is twined around the screw shaft portion. Because of this phenomenon and the slow-down of the flow, the molten material becomes stagnant. Although this stagnancy is controlled by the molten material newly fed from the melting section 15, contact between molten PET and PEN is carried out widely during the stagnancy and the unmolten PEN granular material is fully wrapped in the molten material so that heat exchange is performed to promote the melting of the unmolten granular material.

The molten material in the melting relaxation section 16 is scratched into the valley of the front screw flights 6 by the flight end of a front half portion and guided by the screw to the kneading section 17 in which the sectional area of the gap around the screw shaft portion is narrowed like the melting section 15 while it is compressed again. It can be assumed that most of the unmolten material is molten when the material is scratched by the flight end, and the already completely molten material is kneaded with the material in the kneading section 17.

The kneaded molten material expands in the kneading relaxation section 18 in which the sectional area of the gap around the screw shaft portion is made much larger than that of the kneading section 17 while it is kneaded by the front screw flights 6. The unmolten material is almost completely molten before it reaches the kneading relaxation section 18 and the molten material is uniformly kneaded by expanding to become homogeneous.

The temperature of the molten material which has been uniformly kneaded in the kneading relaxation section 18 is uniformly adjusted in the metering zone 14 and supplied into a front portion of the heating cylinder. The molten material is metered at an end of the screw by the backward movement of the injection screw 2 caused by the pressure of the material. This metering time differs according to the injection amount of the molten material, but is generally 5 to 7 sec. for 25 to 80 g. Thereafter, the molten material is injected and filled into an injection mold from a nozzle 4 by the forward movement of the injection screw 2 and molded into a preform.

As described above, in the plastication of PET+PEN which has been subjected to a repetition of melting, relaxation, kneading and relaxation, the melting of the unmolten gel-like granular material (PEN) is promoted by melting relaxation and at the same time the kneading of PET+PEN which has weakness in compatibility is carried out uniformly to make the molten material homogeneous. It is assumed that an ester exchange reaction could take place due to a series of melting relaxation, kneading and kneading relaxation steps. Accordingly, incompatibility which is assumed to cause opaque white turbidity is improved and a transparent preform free from a fish eye can be molded.

The plastication of PET+PEN can be carried out at a temperature of 310° C. or less, a back pressure of 2 to 10 kg/cm$^2$ and a screw rotation speed of 80 to 100 rpm. Although there is the stagnancy of the molten material, which is not especially long, the amount of acetaldehyde produced by pyrolysis is small and the retention rate of the IV value of the material resin by hydrolysis is not lowered.

To mold a plurality of preforms by one shot of injection and filling, a hot runner is generally used. This hot runner is installed in a hot runner block which constitutes a part of a mold and connected to a plurality of nozzles provided at fixed intervals in the hot runner block and to a single sprue. In the above injection unit, the nozzle is touched by the sprue so that the molten material injected into the sprue by the forward movement of the injection screw is injected and filled into each cavity in the preform mold from each nozzle through the hot runner.

While this injected molten material reaches the cavity from the nozzle through the hot runner, the hot runner block, the sprue and the nozzle are heated to 280 to 330° C., 280° C. and 290 to 310° C., respectively, to prevent a drop in the temperature of the molten material.

The injection molded preform is released from the injection mold and taken out while it is hot before it is cooled and set, or cooled, set, released and taken out. A process for stretch blow molding a preform which is released in an early stage before it is cooled and set into a bottle having a thin body and a thin bottom is called "hot parison system" in contrast to "cold parison system" in which a cooled and set preform is heated again to the molding temperature and then stretch blow molded.

This hot parison system is available in two types: (1) an indirect temperature conditioning type in which the temperature of a hot preform is conditioned and then stretching and blowing are carried out and (2) a direct temperature conditioning type in which the temperature of a preform is adjusted by controlling the thickness distribution at the time of injection molding and stretching and blowing are carried out right after, as disclosed in Japanese Laid-Open Patent Publication No. 4-214322. Any one of the above types of the system may be used to stretch blow mold an injection molded preform into a thin-wall bottle.

One example of stretch blow molding in accordance with the above hot parison system is described below. To mold a preform, an injection mold consisting of a cavity mold for forming the outside of the preform and a core mold for forming the inner side of the preform, and a lip mold for forming the outside of the mouth of the preform are used. Both the cavity mold and the core mold are cooled to 11 to 16° C. A cavity is formed between the cavity mold and the core mold inserted into the cavity mold through an opening portion of the cavity mold and the closed lip mold. The molten material having a resin temperature of around 260° C. immediately after purging is injected and filled into the cavity from the nozzle through the hot runner.

The injection molded preform is released from the injection mold while it has sufficient heat required for molding in an inner main portion to be stretch blow molded. This release is carried out by moving up both the core mold and the lip mold or moving up the core mold and moving down the cavity mold. The released preform is transferred to a blow mold while a cooled and set portion thereof around the mouth portion is held in the lip mold. In the blow mold, the preform is stretched in an axial direction and air is blown thereinto.

Air blowing at the time of stretch blow molding is preferably carried out in first and second stages. The air blow pressure of the second stage may be set 2 times or more that of the first stage. By stretching up to about 2 times in a longitudinal direction and up to about 3 times in a transverse direction, the most preferred bottle can be obtained.

[EXAMPLES 1]

Used Molding Machine

Injection Stretch Blow Molding Machine AOKI-100LL-20,
500 cc, accepting three preforms manufactured by A.K. Technical Laboratory, Inc.

Resin Material

PET Unipet 8 (of Unipet Co.)
PEN Copolymer of terephthalate:NDC=8:92 (of AMOCO of USA) Mixing Ratio PET 90%, PEN 10%

Molded Article bottle for drinking water size total height: 210 mm, inner diameter of mouth: 22 mm, length below neck: 190 mm, outer diameter of body: 64 to 60 mm, thickness of body: 0.27 mm, weight: 23 g Preform size total height: 95 mm, inner diameter of mouth: 22 mm, length below neck: 75 mm, thickness of body: 2.8 mm, outer diameter of body: 26 mm, outer diameter of lower end of body: 24 mm Preform Molding Conditions set temperature of injection heating cylinder
    maximum: 290° C., minimum: 275° C.
screw rotation speed: 90 rpm
back pressure: 5 kg/cm$^2$
first injection pressure: 140 kg/cm$^2$
second injection pressure: 50 kg/cm$^2$
filling pressure retention time: 3.6 seconds
cooling time: 1.0 second
temperature of injection mold (set temperature):
    cavity mold: 12° C.
    core mold: 12° C.
temperature of hot runner (set temperature)
    sprue: 280° C.
    block: 280° C.
    nozzle: 290° C.
releasing temperature: 70° C. (preform surface temperature)

Stretch blow molding conditions mold temperature (set temperature): 90° C.
stretching and blowing temperature: 100° C. (preform surface temperature)
blow pressure (stretching): 15 to 20 kg/cm$^2$
blow time: 1.0 to 1.5 second

[EXAMPLE 2]

Used Molding Machine

Injectior. Stretch Blow Molding Machine AOKI-100LL-20,
500 cc, accepting two preforms, manufactured by A.K. Technical Laboratory, Inc.

Resin Material

PET Unipet RM553K (of Unipet Co.)
PEN PN610 (of Toyo Boseki Co.)
Mixing Ratio PET 60%, PEN 40%

Molded Article bottle for drinking water size total height: 210 mm, inner diameter of mouth: 22 mm, length below neck: 190 mm, outer diameter of body: 64 to 60 mm, thickness of body: 0.27 mm, weight: 23 g Preform size total height: 95 mm, inner diameter of mouth: 22 mm, length below neck: 75 mm, thickness of body: 2.8 mm, outer diameter of body: 26 mm, outer diameter of lower end of body: 24 mm

Preform Molding Conditions set temperature of injection heating cylinder
    maximum: 280° C., minimum: 270° C.
screw rotation speed: 100 rpm
back pressure: 3 kg/cm$^2$
first injection pressure: 140 kg/cm$^2$
filling pressure retention time: 3.6 seconds
cooling time: 1.0 second
temperature of injection mold (set temperature):
    cavity mold: 15° C.
    core mold: 15° C.
temperature of hot runner (set temperature)
    sprue: 280° C.
    block: 320° C.
    nozzle: 310° C.
releasing temperature: 70 to 80° C. (preform surface temperature)

Stretch Blow Molding Conditions mold temperature (set temperature): 140° C.
stretching and blowing temperature: 109° C. (preform surface temperature)
blow pressure (stretching): 15 to 20 kg/cm$^2$
blow time: 1.0 to 1.5 second

[EXAMPLE 3]

Used Molding Machine

Injection Stretch Blow Molding Machine AOKI-100LL-20,
accepting one preform, manufactured by A.K. Technical Laboratory, Inc.

Resin Material

PET Unipet RM553K (of Unipet Co.)
PEN PN610 (of Toyo Boseki Co.)
Mixing Ratio PET 50%, PEN 50%

Molded Article wide-mouthed vessel (octagon)

size total height: 850 mm, inner diameter of mouth: 64 mm, length below neck: 64 mm, outer diameter of body: 70 to 74 mm, thickness of body: 0.3 mm, weight: 25 g

Preform size total height: 40 mm, inner diameter of mouth: 64 mm, length below neck: 22 mm, thickness of body: 3 mm

Preform Molding Conditions set temperature of injection heating cylinder
    maximum: 280° C., minimum: 270° C.
screw rotation speed: 90 rpm
back pressure: 5 kg/cm$^2$
first injection pressure: 140 kg/cm$^2$
filling pressure retention time: 3.6 seconds
cooling time: 1.0 second
temperature of injection mold (set temperature):
    cavity mold: 12° C.
    core mold: 12° C.
temperature of hot runner (set temperature)
    sprue: 280° C.
    block: 330° C.
    nozzle: 300° C.
releasing temperature: 70 to 80° C. (preform surface temperature)

Stretch Blow Molding Conditions mold temperature (set temperature): 150° C.
stretching and blowing temperature: 104° C. (preform surface temperature)
blow pressure (stretching): 10 kg/cm$^2$ for first stage, 18 kg/cm$^2$ for second stage
blow time: 1.0 to 1.5 second

[EXAMPLES 4]

Used Molding Machine

Injection Stretch Blow Molding Machine AOKI-100LL-20,
500 cc, accepting one preform manufactured by A.K. Technical Laboratory, Inc.

Resin Material

PET RT553C (of Unipet Co.)
PEN PN610 (of Toyo Boseki Co.)
Mixing Ratio PET 90%, PEN 10%

Molded Article bottle for drinking water size total height: 208 mm, inner diameter of mouth: 22 mm, length below neck: 186.4 mm, outer diameter of body: 68.2 mm, thickness of body: 0.3~0.4 mm, weight: 28 g

Preform size total height: 95.9 mm, inner diameter of mouth: 22 mm, length below neck: 74 mm, thickness of body: 3.95 mm, outer diameter of body: 26.6 mm, outer diameter of lower end of body: 23.0 mm

Preform Molding Conditions set temperature of injection heating cylinder
    maximum: 285° C., minimum: 275° C.
screw rotation speed: 146 rpm
back pressure: 6 kg/cm$^2$
first injection pressure: 139.7 kg/cm$^2$
second injection pressure: 71.4 kg/cm$^2$
filling pressure retention time: 7.9 seconds
cooling time: 5.9 second
temperature of injection mold (set temperature):
    cavity mold: 12° C.
    core mold: 12° C.

temperature of hot runner (set temperature)
  sprue: 285° C.
  block: 290° C.
  nozzle: 280° C.
releasing temperature: 50~70° C. (preform surface temperature)

Stretch blow molding conditions mold temperature (set temperature): 116° C.
stretching and blowing temperature: 78~85° C. (preform surface temperature)
blow pressure (stretching): 24 kg/cm$^2$
blow time: 9 seconds

[EXAMPLES 5]

Used Molding Machine

Injection Stretch Blow Molding Machine AOKI-pb 100LL-20,
1,500 cc, accepting four preforms manufactured by A.K. Technical Laboratory, Inc.

Resin Material

PET RT553C (of Unipet Co.)
PEN PN610 (of Toyo Boseki Co.)
Mixing Ratio PET 90%, PEN 10%

Molded Article bottle for drinking water size total height: 309 mm, inner diameter of mouth: 22 mm, length below neck: 281 mm, outer diameter of body: 93 mm, thickness of body: 0.3~0.5 mm, weight: 58.5 g Preform size total height: 141 mm, inner diameter of mouth: 22 mm, length below neck: 115 mm, thickness of body: 5.2 mm, outer diameter of body: 28.9 mm, outer diameter of lower end of body: 25 mm Preform Molding Conditions set temperature of injection heating cylinder maximum: 280° C., minimum: 275° C.
screw rotation speed: 70 rpm
back pressure: 5 kg/cm$^2$
first injection pressure: 140 kg/cm$^2$
second injection pressure: 75 kg/cm$^2$
filling pressure retention time: 13.4 seconds
cooling time: 15 second
temperature of injection mold (set temperature):
  cavity mold: 12° C.
  core mold: 12° C.

temperature of hot runner (set temperature)
  sprue: 280° C.
  block: 280° C.
  nozzle: 280° C.
releasing temperature: 50~70° C. (preform surface temperature)

Stretch blow molding conditions mold temperature (set temperature): 138° C.
stretching and blowing temperature: 93~95° C. (preform surface temperature)
blow pressure (stretching): 26 kg/cm$^2$
blow time: 18 seconds

[Results]

Bottles and wide-mouthed vessels molded in the above examples were free from dislocation and devoid of opaque portions. When they were entirely observed, they were transparent and free from nonuniform thickness, there is no creases due to the insufficiency of ester exchange reaction, and the production of gel-like unmolten particles was null. Further, they had rigidity as a whole. When 10% of PEN was blended, the resulting molded article withstood a temperature of 80° C. and no thermal deformation was not observed. When a molded article containing sealed contents was dropped from a height of 2 m several times, no damage was observed and it was found to have sufficient impact strength.

What is claimed is:

1. An injection screw for injecting and/or plasticating a polyester resin, said screw being arranged in a heating cylinder so as to be rotationally, forward and backward movable, wherein said screw comprises a material feed zone, a compression zone, a plastication zone and a metering zone in order, said plastication zone has operation sections of a melting section, a melting relaxation section, a kneading section and a kneading relaxation section in order from the compression zone side to the metering zone side, said two relaxation sections are formed by expanding gaps between the heating cylinder and a screw shaft portion with the partially reduced diameter of the screw shaft portion so as to promote the melting of unmolten material remaining in molten material and uniformly kneading molten material, and the melting relaxation section of the plastication zone has a portion devoid of flights so as to divide screw flights into front screw flights and rear screw flights.

2. An injection screw according to claim 1, wherein a part of said front screw flights is made of double flights so as to set a narrower pitch than that of the rear screw flights.

3. An injection screw according to claim 2, wherein the diameter of the screw shaft at said relaxation sections is 70 to 80% reduced diameter of the screw shaft of the melting section.

4. An injection screw according to claim 1, wherein the diameter of the screw shaft at said relaxation sections is 70–80% reduced diameter of the screw shaft of the melting section.

* * * * *